(12) United States Patent  
Takizawa et al.

(10) Patent No.: US 9,294,945 B2  
(45) Date of Patent: Mar. 22, 2016

(54) TEST APPARATUS AND TEST METHOD

(71) Applicants: Keisuke Takizawa, Atsugi (JP); Reiichi Hashimoto, Atsugi (JP)

(72) Inventors: Keisuke Takizawa, Atsugi (JP); Reiichi Hashimoto, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 14/631,288

(22) Filed: Feb. 25, 2015

(65) Prior Publication Data

US 2015/0281984 A1    Oct. 1, 2015

(30) Foreign Application Priority Data

Mar. 28, 2014  (JP) ................... 2014-068951

(51) Int. Cl.  
    *H04B 17/00*    (2015.01)  
    *H04W 24/06*    (2009.01)

(52) U.S. Cl.  
    CPC .................... *H04W 24/06* (2013.01)

(58) Field of Classification Search  
    CPC .................................................... H04W 24/06  
    USPC ......................................................... 455/67.14  
    See application file for complete search history.

(56) References Cited

U.S. PATENT DOCUMENTS 5,978,649 A * 11/1999 Kahn ................. H04N 7/165  
    348/E7.063  
7,466,985 B1 * 12/2008 Handforth ............. H04W 72/08  
    370/312  
2006/0079232 A1 * 4/2006 Omori ............... H04W 36/0088  
    455/436  
2008/0130508 A1 * 6/2008 Vikstedt ............... H04W 24/06  
    370/241  
2009/0312898 A1 * 12/2009 Hashimoto ......... G05B 19/0428  
    701/29.1  
2012/0050118 A1 * 3/2012 Teshirogi ............... G01R 29/10  
    343/703  
2012/0155431 A1 * 6/2012 Kang ........................... 370/331  
2012/0238311 A1 * 9/2012 Takahashi .......... H04W 52/243  
    455/522  
2012/0257578 A1 * 10/2012 Ohta ................... H04W 74/008  
    370/328  
2013/0070625 A1 * 3/2013 Fujishima ............. H04W 36/20  
    370/252  
2013/0223309 A1 * 8/2013 Hsiao .................... H04W 28/14  
    370/311

FOREIGN PATENT DOCUMENTS

| JP | 2010-527173 | 8/2010 |
|---|---|---|
| JP | 2014-006618 | 1/2014 |
| WO | WO 2008/131814 A1 | 11/2008 |

* cited by examiner

*Primary Examiner* — April G Gonzalez  
(74) *Attorney, Agent, or Firm* — Greer Burns & Crain Ltd.

(57) ABSTRACT

According to one embodiment, a test apparatus includes a reception buffer configured to store uplink data, a transmission buffer configured to store downlink data, an arithmetic processing module configured to execute reception arithmetic processing on the uplink data read from the reception buffer, and to execute transmission arithmetic processing to generate downlink data and store the generated downlink data in the transmission buffer, and a management module configured to provide, under a first predetermined condition, the arithmetic processing module with a first instruction to execute the reception arithmetic processing, and to provide, under a second predetermined condition, the transmitting/receiving module with a second instruction to transmit the downlink data stored in the transmission buffer.

18 Claims, 10 Drawing Sheets

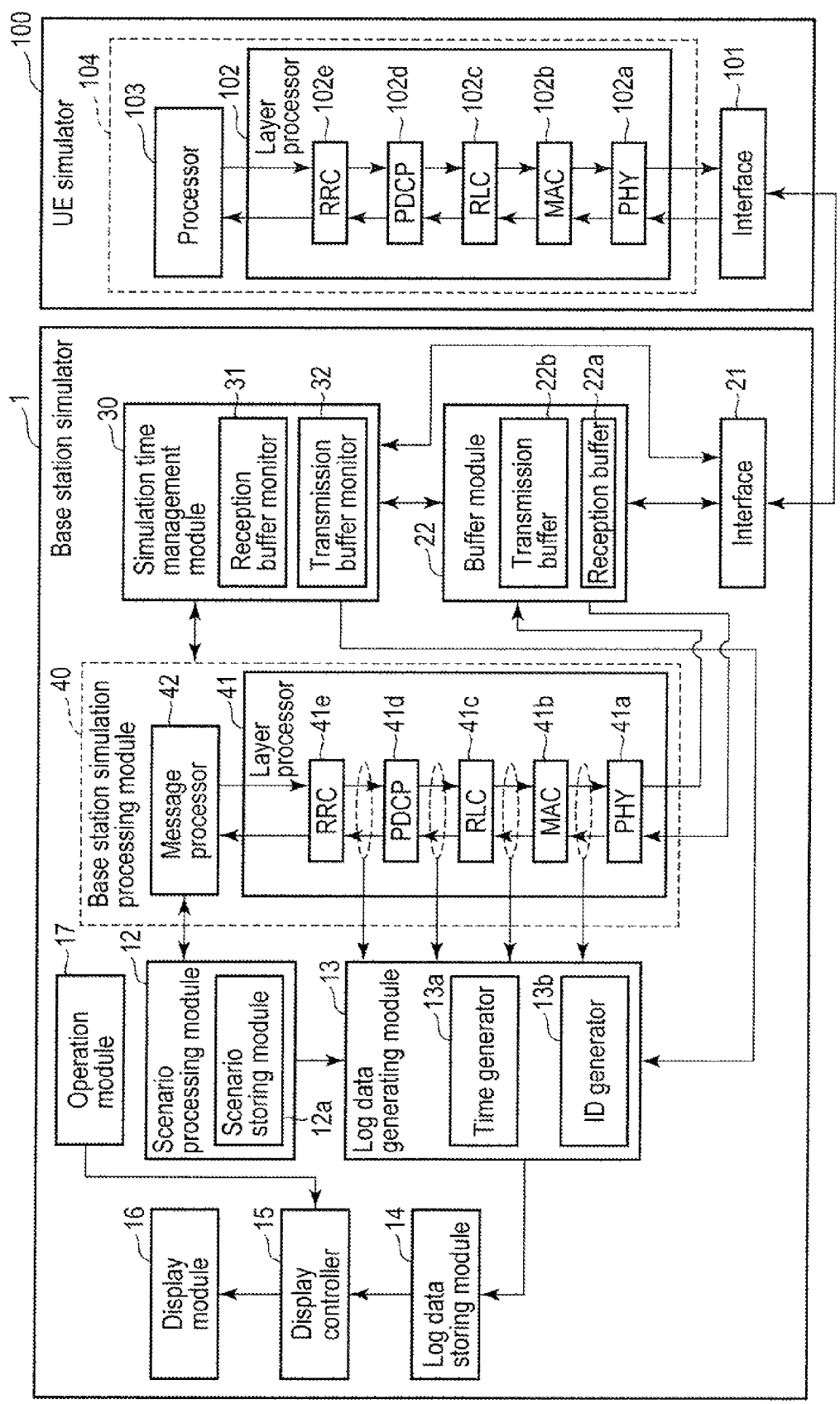
F I G. 1

Test scenario
   [Execute before start of communication with mobile communication terminal]
   • Initial setting of each element of test apparatus
      • Parameter setting in layer processor
         • Ciphering initial state: OFF

[Start of communication with mobile communication terminal]
   • Transmit message ○○
   • Ciphering: ON
   • Upon receiving message △△, transmit message ××
   • Transmit message ◇◇
   • Ciphering: OFF

F I G. 2

| No. | PHY | MAC | RLC | PDCP | RRC | Primitive | BTS | Channel | Message | Simulation Time | Progress Time |
|---|---|---|---|---|---|---|---|---|---|---|---|
| 132 | | | | ↓ | | LTE_PDCP_DATA_REQ | 1 | LTE_DL_DTCH 0 | RRC CONNECTION RECONFIGURATION | 000.01.13.750 | 000.05.41.000 |
| 133 | | | ↓ | | | LTE_RLC_DATA_REQ | 1 | LTE_DL_DTCH 0 | | 000.01.13.750 | 000.05.41.000 |
| 134 | | ↓ | | | | LTE_MAC_DATA_REQ | 1 | LTE_DL_DTCH 0 | | 000.01.13.750 | 000.05.41.000 |
| 135 | ↓ | ↑ | | | | LTE_PHY_DATA_REQ | 1 | LTE_DL_SCH 1 | | 000.01.13.750 | 000.05.41.000 |
| 136 | | ↑ | | | | LTE_PHY_DATA_IND | 1 | LTE_UL_SCH 0 | | 000.01.24.500 | 000.06.58.250 |
| 137 | | ↑ | | | | LTE_MAC_DATA_IND | 1 | LTE_UL_DTCH 0 | | 000.01.24.500 | 000.06.58.250 |
| 138 | | | ↑ | | | LTE_RLC_DATA_IND | 1 | LTE_UL_DTCH 0 | | 000.01.24.500 | 000.06.58.250 |
| 139 | | | | ↑ | | LTE_PDCP_DATA_IND | 1 | LTE_UL_DTCH 0 | RRC CONNECTION RECONFIGURATION COMPLETE | 000.01.24.500 | 000.06.58.250 |

RRC
└ DL-DTCH-Message
　└ C1

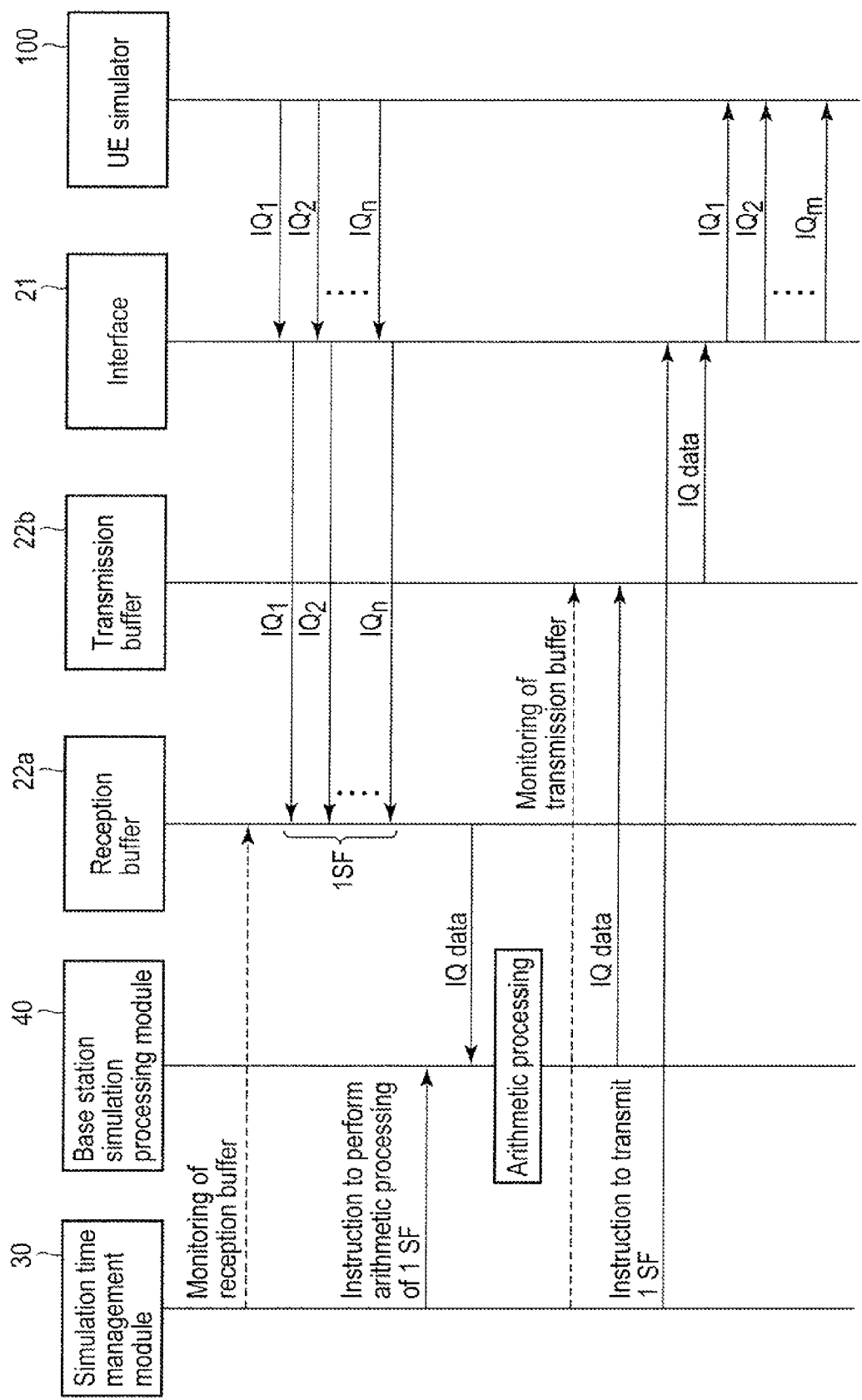
F I G. 6

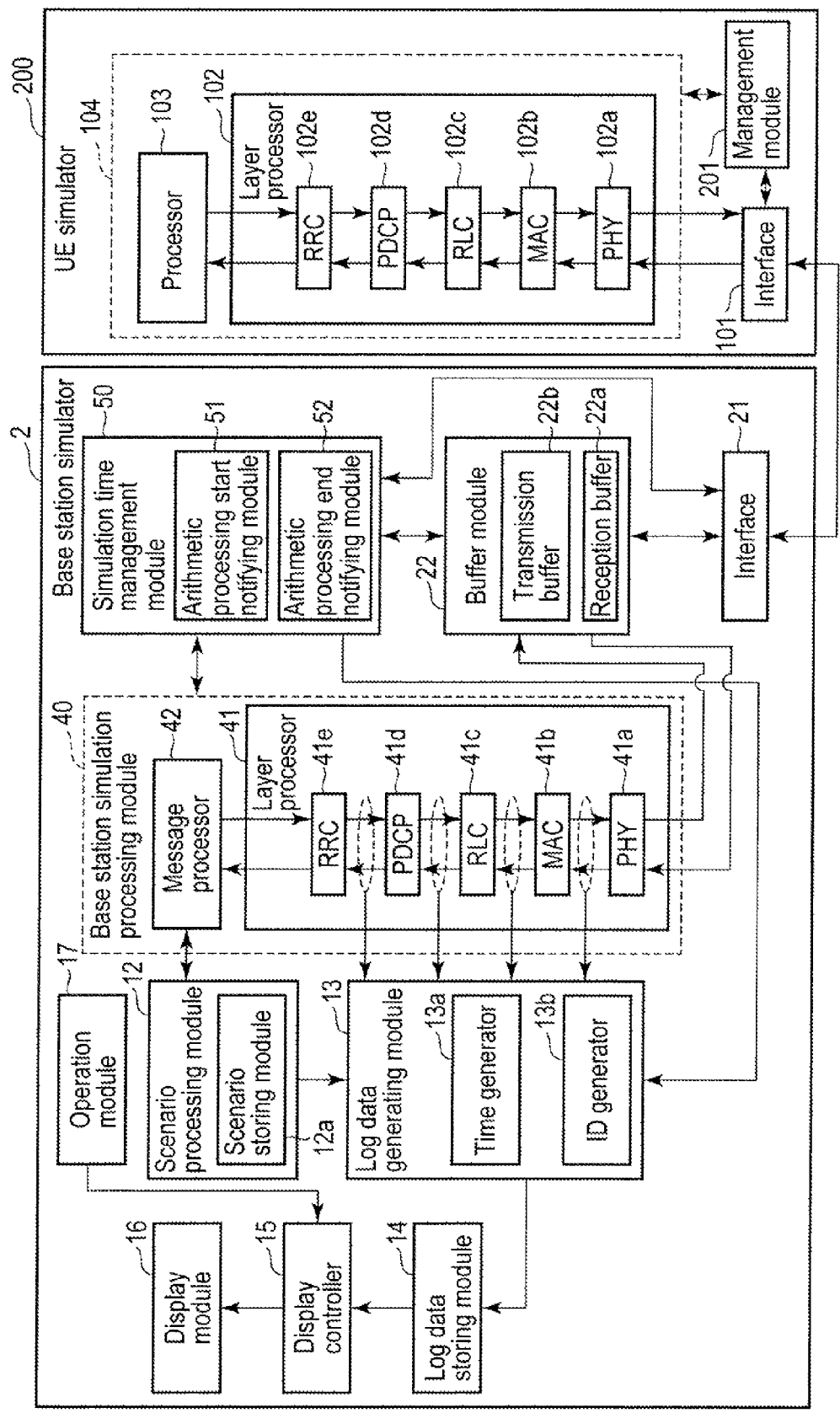
F I G. 7

TEST APPARATUS AND TEST METHOD

CROSS-REFERENCE TO RELATED APPLICATIONS

This application is based upon and claims the benefit of priority from prior Japanese Patent Application No. 2014-068951, filed Mar. 28, 2014, the entire contents of which are incorporated herein by reference.

BACKGROUND OF THE INVENTION

1. Field of the Invention

The invention relates to a test apparatus and test method for communicating with a simulated terminal that simulates the communication function of a mobile communication terminal for transmitting and receiving a radio frequency signal based on a predetermined communication standard, thereby testing the communication function during the execution thereof.

2. Description of the Related Art

After a mobile communication terminal, such as a cellular phone, is newly developed, it needs to be tested whether or not it operates normally in an actual operation environment. However, it is extremely difficult to test whether or not the newly developed communication terminal normally operates, by transmitting and receiving various types of communication test information between this terminal and an already working actual base station.

In view of this, a test apparatus has been proposed which comprises a pseudo base station having a function similar to that of an actual base station, and in which the pseudo base station is connected to a newly developed mobile communication terminal to enable them to transmit and receive various types of communication information and to thereby test whether or not the newly developed mobile communication terminal operates normally (see, for example, Jpn. Pat. Appln. KOKAI Publication No. 2014-006618).

Since this type of test apparatus uses, as a test target, a mobile communication terminal as hardware, the test is executed after the mobile communication terminal is formed of hardware. Accordingly, a long period is required for the development of the mobile communication terminal. There is a demand for improvement in the development.

It is possible to realize a pseudo terminal as software, using a general-purpose computer, which terminal simulates the communication function of a mobile communication terminal as a test target, and to connect the pseudo terminal to a pseudo base station by a fixed line to thereby confirm the communication function of the pseudo terminal. In this case, it is simple and preferable to realize a configuration for inputting/outputting a packet including a baseband signal to test the pseudo terminal, and for transmitting/receiving the packet including the baseband signal between the pseudo terminal and the pseudo base station via a network, as is described in Patent Document 2 (see, for example, Jpn. PCT National Publication No. 2010-527173).

However, the test apparatus constructed as the above cannot communicate with the pseudo terminal in a real-time manner unlike the actual operation environment, inevitably resulting in non real-time communication. As a result, the pseudo terminal cannot be accurately evaluated.

More specifically, when the pseudo terminal is realized by a computer, a certain processing time is required for the control of hardware and software resources associated with the computer, which requires a longer signal processing time than a pseudo terminal having an IC dedicated for communication. As a result, real-time communication cannot be realized between the pseudo terminal and the pseudo base station, unlike an actual operation environment.

Furthermore, in a configuration where a packet is transmitted and received between a computer and a pseudo base station via a network, retransmission of a packet due to delay of a packet or loss of the packet may occur, with the result that real-time communication cannot be realized between the pseudo terminal and the pseudo base station, unlike the actual operation environment.

If real-time communication cannot be achieved between the pseudo terminal and the pseudo base station as described above, the test apparatus having the above-mentioned structure cannot accurately evaluate the pseudo terminal because the operation environment becomes different from the actual one.

BRIEF SUMMARY OF THE INVENTION

In accordance with a first aspect of the invention, there is provided a test apparatus (1) configured to communicate with a pseudo terminal (100, 200) that simulates a communication function of a mobile communication terminal for transmitting and receiving radio frequency signals based on a predetermined communication standard, thereby testing the communication function during execution thereof, comprising:

a transmitting/receiving module (21) configured to transmit and receive digital data corresponding to a baseband signal to and from the pseudo terminal (100, 200);

a reception buffer (22a) configured to temporarily store uplink data as the data received from the pseudo terminal (100, 200) by the transmitting/receiving module (21);

a transmission buffer (22b) configured to temporarily store downlink data as the data to be transmitted to the pseudo terminal (100, 200) via the transmitting/receiving module (21);

an arithmetic processing module (40) configured to execute reception arithmetic processing, based on the predetermined communication standard, on the uplink data read from the reception buffer (22a), to execute transmission arithmetic processing based on the predetermined communication standard to generate the downlink data, and to store the generated downlink data in the transmission buffer (22b); and a management module (30, 50) configured to provide, under a first predetermined condition, the arithmetic processing module (40) with a first instruction to execute the reception arithmetic processing, and to provide, under a second predetermined condition, the transmitting/receiving module (21) with a second instruction to transmit the downlink data stored in the transmission buffer (22b).

In the test apparatus of the first aspect of the invention constructed as the above, the management module causes the arithmetic processing module to perform reception arithmetic processing of uplink data based on the first predetermined condition, and causes the transmitting/receiving module to transmit downlink data based on the second predetermined condition. As a result, the test apparatus can be synchronized with the pseudo terminal, and therefore does not require real-time performance. Thus, the test apparatus according to the first aspect of the invention can accurately evaluate the pseudo terminal that cannot perform real-time communication.

In accordance with a second aspect of the invention, the test apparatus according to the first aspect of the invention further comprises the following features:

the management module (30) further comprises:

a reception buffer monitoring module (31) configured to monitor the reception buffer (22a), and to provide the arithmetic processing module (40) with the first instruction using, as the first predetermined condition, the fact that an amount of the uplink data stored in the reception buffer (22a) has reached a predetermined amount; and a transmission buffer monitoring module (32) configured to monitor the transmission buffer (22b), and to provide the transmitting/receiving module (21) with the second instruction using, as the second predetermined condition, the fact that an amount of the downlink data stored in the transmission buffer (22b) has reached a predetermined amount.

In the test apparatus according to the second aspect of the invention, constructed as the above, when the uplink data stored in the reception buffer has reached a predetermined amount, or when the downlink data stored in the transmission buffer has reached a predetermined amount, the test apparatus can be synchronized with the pseudo terminal, and hence real-time performance is not required. Thus, the test apparatus according to the second aspect of the invention can accurately evaluate the pseudo terminal that cannot perform real-time communication.

In accordance with a third aspect of the invention, the test apparatus according to the first aspect of the invention further comprises the following features:

the pseudo terminal (200) transmits, to the test apparatus, an arithmetic processing start command to start arithmetic processing, in association with the transmission, by the pseudo terminal (200), of an amount of uplink data to be subjected step by step to the reception arithmetic processing by the arithmetic processing module; and the management module (50) further comprises:
an arithmetic processing start notifying module (51) configured to provide the arithmetic processing module (40) with the first instruction, using, as the first predetermined condition, the fact that the arithmetic processing start command is received from the pseudo terminal (200); and an arithmetic processing end notifying module (52) configured to provide the transmitting/receiving module (21) with the second instruction, using, as the second predetermined condition, the fact that the arithmetic processing module (40) has finished generation of the downlink data.

The test apparatus according to the third aspect of the invention, constructed as the above, can be synchronized with the pseudo terminal when an arithmetic processing start command for the uplink data is received, or when generation of the downlink data is finished. This does not require real-time performance. As a result, the test apparatus according to the third aspect of the invention can accurately evaluate the pseudo terminal that cannot perform real-time communication.

In accordance with a fourth aspect of the invention, the test apparatus according to the first aspect of the invention further comprises a feature that the management module (30, 50) manages a simulation time that differs from a real time and is measured during execution of the communication function of the pseudo terminal (100, 200).

The test apparatus according to the fourth aspect of the invention, constructed as the above, can test the pseudo terminal based on the simulation time.

In accordance with a fifth aspect of the invention, the test apparatus according to the fourth aspect of the invention further comprises the following features:

the arithmetic processing module (40) includes a plurality of layers (41a to 41e) whose processes are defined by the communication standard, the test apparatus further comprises:
a log data generation module (13) configured to generate communication log data between predetermined layers (41a to 41e) of the arithmetic processing module (40); and a log display (16) configured to display a log based on the log data, wherein
the log data generation module (13) generates the log data in a manner that the log data includes time information associated with the simulation time; and the log display (16) displays the log in a manner that the log includes the time information associated with the simulation time.

The test apparatus according to the fifth aspect of the invention, constructed as the above, can display a log including time information associated with the simulation time.

In accordance with a sixth aspect of the invention, the test apparatus according to the fifth aspect of the invention further comprises the following features:

the log data generation module (13) generates log data including time information associated with the real time, as well as the time information associated with the simulation time; and the log display (16) displays a log that recites both the time information associated with the simulation time and the time information associated with the real time.

The test apparatus according to the sixth aspect of the invention, constructed as the above, can display a log that recites both the time information associated with the simulation time and the time information associated with the real time.

In accordance with a seventh aspect of the invention, the test apparatus according to the first aspect of the invention further comprises a feature that the communication function of the pseudo terminal (100, 200) is realized by a software program.

The test apparatus according to the seventh aspect of the invention, constructed as the above, can accurately evaluate the communication function of the pseudo terminal even when the communication function regarded as a test target is realized by a software program.

In accordance with an eighth aspect of the invention, the test apparatus according to the first aspect of the invention further comprises a feature that the communication function of the communication function (100, 200) is realized by a semiconductor integrated circuit.

The test apparatus according to the eighth aspect of the invention, constructed as the above, can accurately evaluate the communication function of the semiconductor integrated circuit even when the semiconductor integrated circuit regarded as a test target processes a baseband signal.

In accordance with a ninth aspect of the invention, the test apparatus according to the first aspect of the invention further comprises a feature that the transmitting/receiving module (21) performs communication using TCP/IP as a communication protocol.

In accordance with a tenth aspect of the invention, there is provided a test method for testing a communication function of a mobile communication terminal during execution of the communication function, by communicating with a pseudo terminal (100, 200) that simulates the communication function of the mobile communication terminal that transmits and receives radio frequency signals based on a predetermined communication standard, comprising:

receiving uplink data as digital data corresponding to a baseband signal from the pseudo terminal (100, 200);

temporarily storing the uplink data;

providing, under a first predetermined condition, a first instruction to process the temporarily stored uplink data;

executing, on the uplink data, reception arithmetic processing based on the communication standard in response to the first instruction;

executing transmission arithmetic processing based on the communication standard to generate downlink data as digital data corresponding to a baseband signal to be transmitted to the pseudo terminal (100, 200);

temporarily storing the downlink data;

providing, under a second predetermined condition, a second instruction to transmit the temporarily stored downlink data; and transmitting the downlink data to the pseudo terminal (100, 200).

Since in the test method according to the tenth aspect of the invention, constructed as the above, reception arithmetic processing of uplink data is performed based on the first predetermined condition, and downlink data is transmitted based on the second predetermined condition, the test method enables an apparatus using the method to be synchronized with the pseudo terminal, and therefore does not require real-time performance. Thus, the test method according to the tenth aspect of the invention can accurately evaluate the pseudo terminal that cannot perform real-time communication.

In accordance with an eleventh aspect of the invention, the test method according to the tenth aspect of the invention further comprises the following features:

the providing the first instruction includes providing the first instruction using, as the first predetermined condition, the fact that an amount of the temporarily stored uplink data has reached a predetermined amount; and the providing the second instruction includes providing the second instruction using, as the second predetermined condition, the fact that an amount of the temporarily stored downlink data has reached a predetermined amount.

In accordance with a twelfth aspect of the invention, the test method according to the tenth aspect of the invention further comprises the following features:

the pseudo terminal (200) transmits an arithmetic processing start command to start arithmetic processing, in association with the transmission, by the pseudo terminal, of an amount of uplink data to be subjected step by step to the reception arithmetic processing;

the providing the first instruction includes providing the first instruction, using, as the first predetermined condition, the fact that the arithmetic processing start command is received from the pseudo terminal (200); and the providing the second instruction includes providing the second instruction, using, as the second predetermined condition, the fact that a step of generating the downlink data is finished.

In accordance with a thirteenth aspect of the invention, the test method according to the tenth aspect of the invention further comprises a feature that the providing the first instruction and the providing the second instruction each include managing a simulation time that differs from a real time and is measured during execution of the communication function of the pseudo terminal (100, 200).

In accordance with a fourteenth aspect of the invention, the test method according to the thirteenth aspect of the invention further comprises the following features:

the reception arithmetic processing and generation of the downlink data are executed by a plurality of layers defined by the communication standard; and the method further comprises:

generating communication log data between predetermined layers in the reception arithmetic processing and generation of the downlink data; and displaying a log based on the log data, wherein the generating the log data includes generating the log data in a manner that the log data includes time information associated with the simulation time; and the displaying the log includes displaying the log in a manner that the log includes the time information associated with the simulation time.

In accordance with a fifteenth aspect of the invention, the test method according to the fourteenth aspect of the invention further comprises the following features:

the generating the log data includes generating log data including time information associated with the real time, as well as the time information associated with the simulation time; and the displaying the log includes displaying a log that recites both the time information associated with the simulation time and the time information associated with the real time.

In accordance with a sixteenth aspect of the invention, the test method according to the tenth aspect of the invention further comprises a feature that the communication function of the pseudo terminal (100, 200) is realized by a software program.

In accordance with a seventeenth aspect of the invention, the test method according to the tenth aspect of the invention further comprises a feature that the communication function of the pseudo terminal (100, 200) is realized by a semiconductor integrated circuit.

In accordance with a twelfth aspect of the invention, the test method according to the tenth aspect of the invention further comprises a feature that the transmitting the downlink data to the pseudo terminal (100, 200) includes executing communication using TCP/IP as a communication protocol.

BRIEF DESCRIPTION OF THE SEVERAL VIEWS OF THE DRAWING

FIG. 1 is a block diagram showing a base station simulator according to a first embodiment of the invention;

FIG. 2 is a conceptual diagram showing a test scenario for the base station simulator according to the first embodiment of the invention;

FIG. 3 shows an example of a log displayed on the display of the base station simulator according to the first embodiment of the invention;

FIG. 6 is a timing chart for the base station simulator according to the first embodiment of the invention;

FIG. 7 is a block diagram showing a base station simulator according to a second embodiment of the invention;

DETAILED DESCRIPTION OF THE INVENTION

Figure 4:
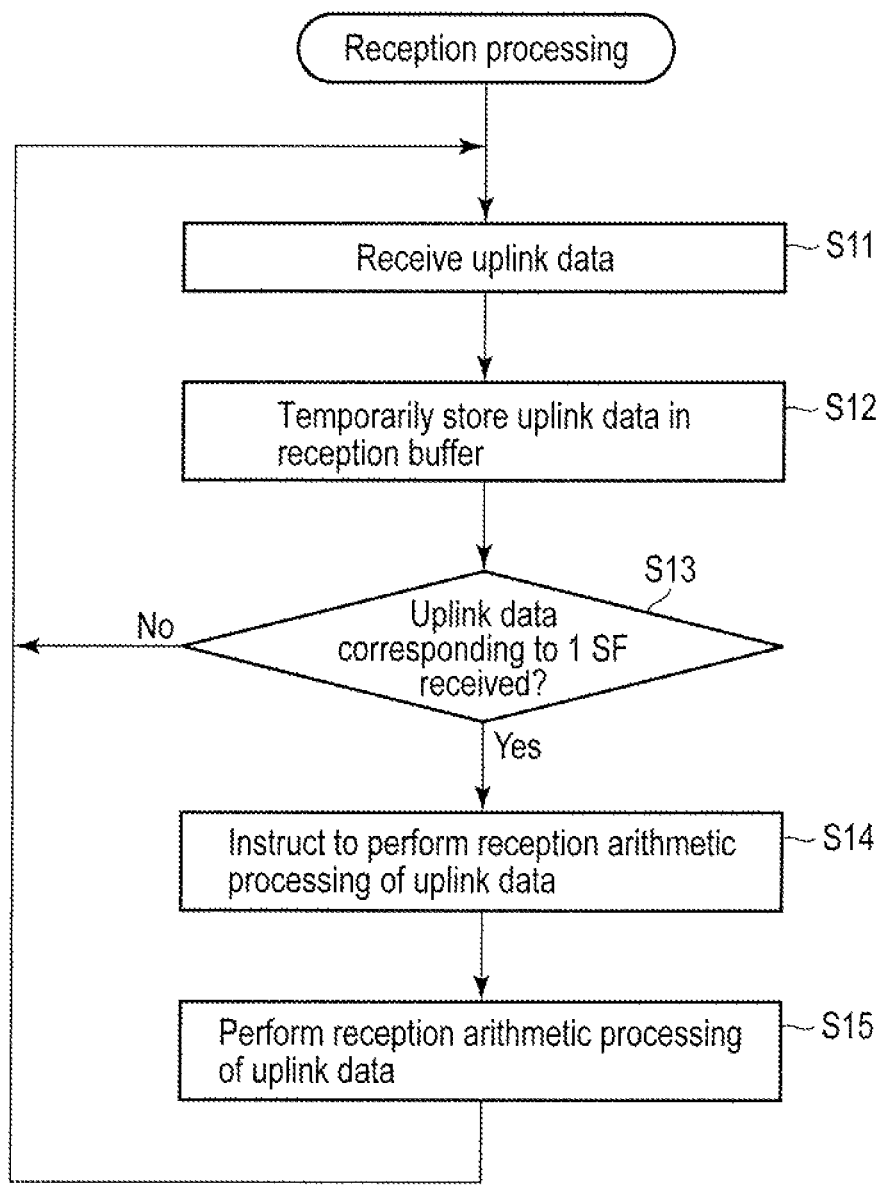
FIG. 4 is a flowchart for the reception processing of the base station simulator according to the first embodiment of the invention.

Embodiments of the invention will be described with reference to the accompanying drawings. More specifically, in the embodiments, a test apparatus according to the invention is applied to a base station simulator as an example, which simulates a base station and tests a pseudo terminal for simulating the communication function of a mobile communication terminal.

First Embodiment

A description will firstly be given of the configuration of a base station simulator according to a first embodiment.

As shown in FIG. 1, a base station simulator 1 according to the first embodiment is configured to communicate with a user equipment (UE) simulator 100 to test the communication function of the UE simulator 100. The UE simulator 100 simulates the communication function of, for example, a cellular phone or mobile terminal for transmitting and receiving a radio frequency signal based on a communication standard called, for example, Long Term Evolution (LTE).

The base station simulator 1 comprises an interface 21, a buffer module 22, a simulation time management module 30, a base station simulation processing module 40, a scenario processing module 12, a log data generating module 13, a log data storing module 14, a display controller 15, a display module 16 and an operation module 17. The base station simulator 1 further comprises a CPU, a ROM, a RAM, an FPGA, and a microcomputer including, for example, an input/output circuit connected to various interfaces, which are not shown. Namely, the base station simulator 1 is realized by a microcomputer that is configured, by executing a control program pre-stored in the ROM, to function as a base station simulator for testing the UE simulator 100. The base station simulator 1 constitutes the test apparatus of the invention.

The interface 21 is configured to transmit, to the UE simulator 100, baseband data (hereinafter referred to simply as "IQ data") of an I-phase component (in-phase component) and a Q-phase component (quadrature component) as downlink data generated by the base station simulation processing module 40, and to receive IQ data as uplink data from the UE simulator 100. The interface 21 constitutes transmission/reception means according to the invention.

In the first embodiment, the interface 21 is assumed, for example, to communicate with the UE simulator 100 via a best-effort network, such as the Ethernet (trademark), utilizing Transmission Control Protocol/Internet Protocol (TCP/IP) as a communication protocol. Accordingly, the interface 21 is assumed to have functions of generating an IP packet, allocating an IP address, determining a transmission source and destination, selecting a data transmission channel, correcting an error, requesting retransmission, etc. However, the transmission/reception means of the invention is not limited to this, but may be formed of such known transmission/reception means as Local Area Network (LAN) or Universal Serial Bus (USB).

The buffer module 22 comprises a reception buffer 22a and a transmission buffer 22b. The reception buffer 22a is configured to temporarily store IQ data received from the UE simulator 100. The transmission buffer 22b is configured to temporarily store IQ data waiting to be transmitted from the interface 21 to the UE simulator 100.

The simulation time management module 30 comprises a reception buffer monitor 31 and a transmission buffer monitor 32. The simulation time management module 30 is configured to manage a simulation time that is made to progress in accordance with the time when the data temporarily stored in the reception buffer 22a reaches a predetermined amount (described later), and differs from a real time based on real time progress. Further, the simulation time management module 30 is configured to entirely control the base station simulator 1.

A description will now be given of the management of the simulation time. Assume here that after receiving IQ data from the base station simulator 1, the UE simulator 100 transmits response IQ data 3 ms after in the simulation time domain. In this case, the UE simulator 100 outputs IQ data with no content (or IQ data formed of only a noise component) for a time period corresponding to an elapsed simulation time, before transmitting the response IQ data. For instance, the UE simulator 100 transmits, to the base station simulator 1, IQ data with no content corresponding to three subframes, since one subframe is 1 ms. Since the data includes no content, the base station simulation processing module 40 does not substantially perform processing. However, the reception buffer monitor 31 detects that IQ data corresponding to three subframes has been received, and therefore the simulation time management module 30 advances the simulation time by 3 ms.

The reception buffer monitor 31 is configured to monitor the reception buffer 22a to detect the amount of data temporarily stored in the reception buffer 22a. The reception buffer monitor 31 is further configured to provide the base station simulation processing module 40 with an instruction (first instruction) to perform reception arithmetic processing on uplink data, when the data temporarily stored in the reception buffer 22a has reached a predetermined amount. This predetermined data amount means a certain amount of data regarded as an operation target, and is, for example, a data amount corresponding to one subframe in the LTE communication standards. The reception buffer monitor 31 constitutes reception buffer monitoring means according to the invention.

The transmission buffer monitor 32 is configured to monitor the transmission buffer 22b to detect the amount of data temporarily stored in the transmission buffer 22b. The transmission buffer monitor 32 is further configured to provide the interface 21 with an instruction (second instruction) to transmit downlink data, when the data temporarily stored in the transmission buffer 22b has reached a predetermined amount (e.g., one subframe). The transmission buffer monitor 32 constitutes transmission buffer monitoring means according to the invention.

As described above, since the base station simulator 1 of the first embodiment is configured to test the UE simulator 100 utilizing IP packet communication, real-time performance as in actual communication cannot be obtained.

In view of the above, the simulation time management module 30 is provided with the reception buffer monitor 31, and is configured to cause the base station simulation processing module 40 to perform arithmetic processing on IQ data, stored in the reception buffer 22a, for a predetermined simulation time period elapsing from when the stored IQ data reached the predetermined amount. More specifically, the simulation time management module 30 advances the simulation time when, for example, IQ data corresponding to one subframe is stored in the reception buffer 22a, and causes the base station simulation processing module 40 to perform arithmetic processing for the predetermined simulation time period.

As a result, the base station simulator 1 can perform a simulation process corresponding to each process performed by an actual base station, at a rate lower than an actual rate. For instance, the base station simulator 1 can be synchronized with the UE simulator 100 such that it receives IQ data corresponding one subframe from the UE simulator 100, and then returns response IQ data corresponding to one subframe to the UE simulator 100.

In an actual base station, signal processing is performed based on a clock frequency of, for example, 10 MHz, while in the base station simulator 1, simulation processing can also be performed as signal processing (slow clock processing) based on a clock frequency of, for example, 1 kHz.

The base station simulation processing module 40 comprises a layer processor 41 and a message processor 42. The base station simulation processing module 40 reads, from the reception buffer 22a, uplink data output from the UE simulator 100 and performs reception arithmetic processing on the data, based on predetermined communication standards. Further, the base station simulation processing module 40 performs transmission arithmetic processing based on the communication standards to thereby generate downlink data, and stores the generated downlink data in the transmission buffer 22b. The base station simulation processing module 40 constitutes arithmetic processing means according to the invention.

The layer processor 41 comprises a PHY 41a for processing a physical (PHY) layer, a MAC 41b for processing a Medium Access Control (MAC) layer of an order higher than the PHY layer, an RLC 41c for processing a Radio Link Control (RLC) layer of an order higher than the MAC layer, a PDCP 41d for processing a Packet Data Convergence Protocol (PDCP) layer of an order higher than the RLC layer, and a RRC 41e for processing a Radio Resource Control (RRC) layer of the highest order. These layers constitute respective layers of the invention.

The layer processor 41 is configured to process respective communication protocols based on the predetermined communication standards, to process communication data from the interface 21 and then send it to the message processor 42, and to process a message from the message processor 42 and send it to the interface 21. At this time, the layer processor 41 outputs, to the log data generating module 13, communication data indicative of content of communication between layers, whenever processing is performed in each layer.

The message processor 42 is configured to perform processing, under the control of the scenario processing module 12, of generating a message to be sent to the UE simulator 100, sending it to the layer processor 41, and processing a message received from the UE simulator 100 via the interface 21 and the layer processor 41.

The scenario processing module 12 is configured to read a test scenario from a scenario storing module 12a pre-storing the test scenario, thereby controlling the elements of the base station simulation processing module 40 including the message processor 42.

FIG. 2 is a conceptual diagram showing a test scenario example. The test scenario recites a communication sequence indicative of the content of communication with the UE simulator 100 and the procedure of the communication, and various settings for the elements of the base station simulator 1. The settings include a setting for changing the base station simulator 1 during testing, as well as initial settings. FIG. 2 recites, as setting examples, a initial setting and changes in setting associated with ciphering of the PDCP layer.

The log data generating module 13 comprises a time generator 13a and an ID generator 13b, and is configured to generate log data based on communication data output from the layer processor 41. The log data generating module 13 constitutes log data generating means according to the invention.

The time generator 13a is configured to generate time information indicative of a real time or a time elapsing from the start of a test. The ID generator 13b is configured to generate a sequential number from the start of the test, which number serves as identifier information (ID) for identifying each log.

The log data generated by the log data generator 13 includes time information generated by the time generator 13a, and identifier information generated by the ID generator 13b. The log data generator 13 may be configured to receive simulation time information from the simulation time management module 30. In this case, log data generated by the log data generator 13 includes simulation time information, as well as real-time information generated by the time generator 13a, which enables a tester to compare a real time in each process with a corresponding time in the simulation time domain.

The log data storing module 14 is formed of, for example, a large-capacity storage medium, such as a hard disk device (HDD) or a flash memory, and is configured to store log data.

The display controller 15 is configured to generate a display screen for displaying logs, to read log data from the log data storing module 14 in accordance with the operation content of the operation module 17, and to display a log on the display module 16 based on information contained in the read log data.

The display module 16 is configured to display a log under the control of the display controller 15. The display module 16 constitutes log display means according to the invention.

The operation module 17 comprises an input device, such as a keyboard, a dial or a mouse, a display for displaying, for example, a test condition, and a control circuit or software for controlling the mentioned elements. The tester operates the operation module in order to input each test condition and/or set display content on the display module 16.

The UE simulator 100 comprises an interface 101, and a simulation processing module 104 including a layer processor 102 and a processor 103. In the first embodiment, it is assumed that the simulation processing module 104 provides the communication function of a UE simulated by the UE simulator 100, and is realized by a software program.

The interface 101 has a structure similar to that of the interface 21 of the base station simulator 1, and is configured to transmit an IP packet including IQ data to the base station simulator 1, and to receive an IP packet from the base station simulator 1. The UE simulator 100 may comprise a reception buffer and a transmission buffer, like the base station simulator 1.

Like the layer processor 41 of the base station simulator 1, the layer processor 102 comprises a PHY 102a for processing a physical (PHY) layer, a MAC 102b for processing a Medium Access Control (MAC) layer of an order higher than the PHY layer, an RLC 102c for processing a Radio Link Control (RLC) layer of an order higher than the MAC layer, a PDCP 102d for processing a Packet Data Convergence Protocol (PDCP) layer of an order higher than the RLC layer, and a RRC 102e for processing a Radio Resource Control (RRC) layer of the highest order.

The processor 103 is configured to generate a message to be transmitted to the base station simulator 1 and transmit it to the layer processor 102, and to process a message sent from the base station simulator 1 via the interface 101 and the layer processor 102.

Referring then to FIG. 3, a description will be given of an example of a log displayed by the display module 16.

The display controller 15 reads log data as a display target from the log data storing module 14, generates display information for log display, and outputs the information to the display module 16. As a result, log display 60 as shown by example in FIG. 3 is made on the display screen of the display module 16.

The log display 60 comprises log number display (No.) 61, layer display (PHY, MAC, RLC, PDCP, RRC/TE) 62, primitive type display (Primitive) 63, BTS (base station) number display (BTS) 64, channel information (Channel) 65, message name display (Message) 66, simulation time information display (Simulation Time) 67 and real-time information display (Progress Time) 68.

Logs in respective processes are displayed on the upper portion of the log display 60 in a time-series manner in the form of a table in the order of time indicated by the simulation time information display 67 and the real-time information display 68. Content display 69 indicative of the data content of a designated log selected by, for example, a tester is highlighted on the lower portion of the log display 60. Real data expressed by a hexadecimal system value is displayed on the lower end of the content display 69.

The log number display 61 is information display that displays a number for identifying a log in each process, based on ID information included in the log data. The layer display 62 is information display that indicates the flow (source and destination layers) of primitive information in the layer processor 41, using an arrow. The primitive type display 63 is information display that indicates the type and name of a primitive based on each primitive name in the log data.

The BTS number display 64 is information display that indicates the number of each base station that performs communication, based on each BTS number in the log data, which number is used when the base station simulator 1 simulates a plurality of base stations using a plurality of base station simulation processing modules 40. The channel information display 65 is information display that indicates each channel used for communication, based on channel information in the log data. The message name display 66 is information display that indicates the name of a message transmitted and received between layers, based on message information in the inter-layer communication data of the log data. The message name display 66 may be omitted depending upon the type of log data. The simulation time information display 67 is information display that indicates the time when data transmission and/or reception was made in each process, based on simulation time information managed by the simulation time management module 30. The real-time information display 68 is information display that indicates the time when data transmission and/or reception was made in each process, based on time information in the log data.

The first row of the log display 60 (indicative of log information with number "132") shown in FIG. 3 indicates that at simulation time "000.01.13.750" (corresponding to real time "000.05.41.000"), primitive processing responsive to LTE#PDCP#DATA#REQ (a data request to PDCP) is executed on data, to be transmitted from a base station with number 1 to the UE simulator 100, in a channel "LTE#DL#DTCH 0" (Downlink Dedicate Traffic Channel 0), whereby a message indicative of RRC Connection Reconfiguration is transmitted from RRC 41e to PDCP 41d.

Transmitting and reception processing operations by the base station simulator 1 of the first embodiment will now be described.

Referring first to FIGS. 1 to 4, the reception processing of the base station simulator 1 will be described.

The interface 21 receives uplink data as digital data corresponding to a baseband signal generated by the UE simulator 100 based on predetermined standards (step S11).

The reception buffer 22a temporarily stores the uplink data received by the interface 21 (step S12).

The reception buffer monitor 31 monitors the reception buffer 22a to determine whether or not uplink data corresponding to one subframe (1 SF) has been stored in the reception buffer 22a (step S13). Note that the amount of data corresponding to one subframe is merely an example, and the invention is not limited to it.

If it is determined in step S13 that uplink data corresponding to one subframe is not stored in the reception buffer 22a, the program returns to step S11.

In contrast, if it is determined in step S13 that uplink data corresponding to one subframe is stored in the reception buffer 22a, the reception buffer monitor 31 provides the base station simulation processing module 40 with an instruction (first instruction) to perform reception arithmetic processing on the uplink data (step S14).

The base station simulation processing module 40 reads uplink data of one subframe as a reception arithmetic processing target from the reception buffer 22a, and executes reception arithmetic processing on the uplink data in accordance with predetermined communication standards (step S15).

In step S15, communication data transmitted between the five layers of the layer processor 41, i.e., the PHY 41a, MAC 41b, RLC 41c, PDC 41d and RRC 41e, is sequentially output to the log data generating module 13, which, in turn, generates log data. The data from the layer processor 41 is transferred to the message processor 42, where it is subjected to predetermined processing executed under the control of the scenario processing module 12. After completing step S15, the program returns to step S11.

Figure 5:
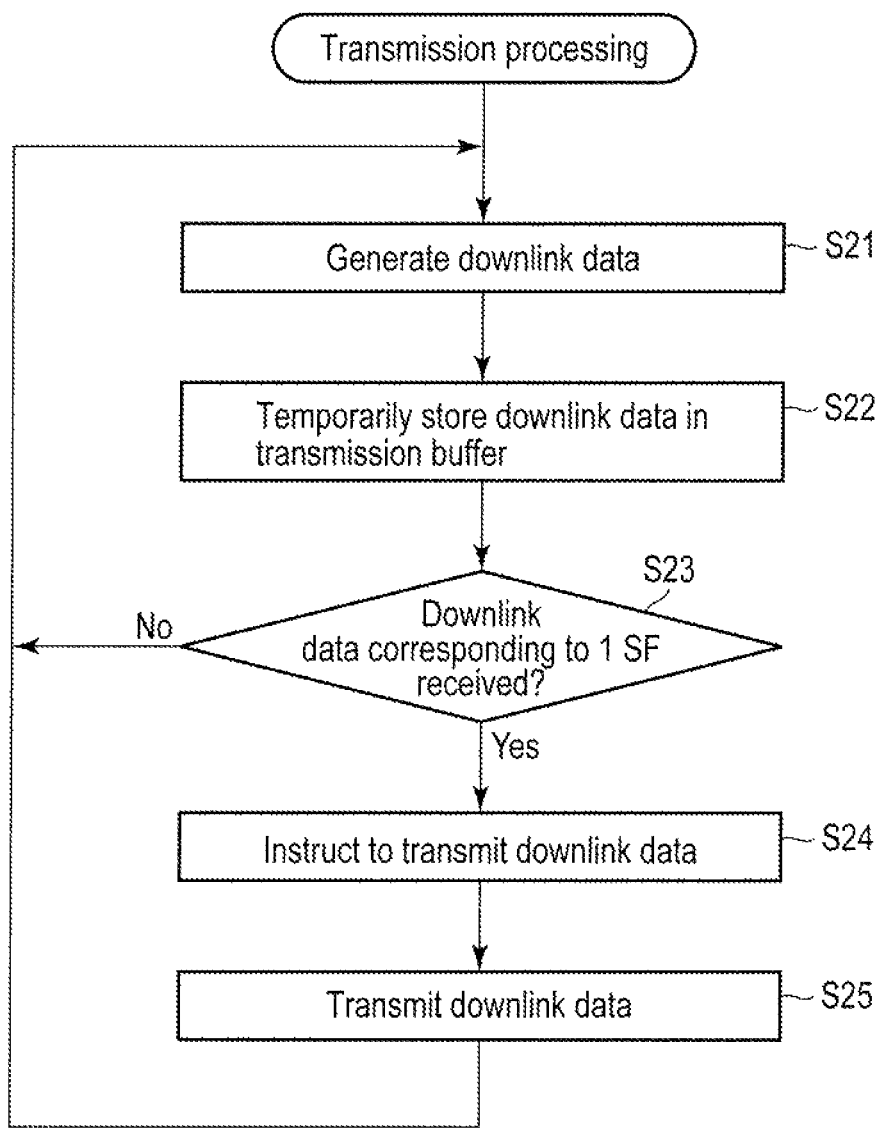
FIG. 5 is a flowchart for the transmission processing of the base station simulator according to the first embodiment of the invention.

Referring then to FIGS. 1 and 5, the transmission processing of the base station simulator 1 will be described.

The base station simulation processing module 40 executes transmission arithmetic processing based on predetermined communication standards, under the control of the scenario processing module 12, thereby generating downlink data to be transmitted to the UE simulator 100 (step S21).

In step S21, communication data transmitted between the five layers of the layer processor 41, i.e., the RRC 41e, PDC 41d, RLC 41c, MAC 41b and PHY 41a, is sequentially output to the log data generating module 13, which, in turn, generates log data.

The transmission buffer 22b temporarily stores the downlink data generated by the base station simulation processing module 40 (step S22).

The transmission buffer monitor 32 monitors the transmission buffer 22b to determine whether or not downlink data corresponding to one subframe (1 SF) has been stored in the transmission buffer 22b (step S23). Note that the amount of data corresponding to one subframe is merely an example, and the invention is not limited to it.

If it is determined in step S23 that downlink data corresponding to one subframe is not stored in the reception buffer 22b, the program returns to step S21.

In contrast, if it is determined in step S23 that downlink data corresponding to one subframe is stored in the transmission buffer 22b, the transmission buffer monitor 32 provides the interface 21 with an instruction (second instruction) to transmit the downlink data (step S24).

The interface 21 reads downlink data of one subframe as a transmission target from the transmission buffer 22b, and transmits it to the UE simulator 100 (step S25). After completing step S25, the program returns to step S21.

The reception processing and transmission processing of the base station simulator 1 will be described with reference to the timing chart of FIG. 6.

Firstly, the reception processing of the base station simulator 1 will be described. In this embodiment, it is assumed that the UE simulator 100 transmits, to the base station simulator 1, n IQ data items $IQ_1$ to $IQn$ as uplink data corresponding to one subframe.

As shown in FIG. 6, after the UE simulator 100 sequentially transmits n IP packets including respective IQ data items $IQ_1$ to $IQn$ to the interface 21, the interface 21 extracts the IQ data from the payload part of the IP packet. The extracted IQ data is sequentially and temporarily stored in the reception buffer 22a.

The reception buffer monitor 31 of the simulation time management module 30 monitors the storage state of the reception buffer 22a, and provides the base station simulation processing module 40 with an instruction (first instruction) to perform reception arithmetic processing, on condition that the reception buffer 22a already stores IQ data of one subframe to be simultaneously subjected to reception arithmetic processing.

The base station simulation processing module 40 reads, from the reception buffer 22a, IQ data of one subframe as a reception arithmetic processing target, and executes reception arithmetic processing on the read IQ data in accordance with the predetermined communication standards.

The transmission processing of the base station simulator 1 will be described. In this embodiment, it is assumed that the base station simulator 1 transmits, to the UE simulator 100, m IQ data items $IQ_1$ to $IQm$ as downlink data corresponding to one subframe.

The base station simulation processing module 40 executes transmission arithmetic processing based on the predetermined communication standards, under the control of the scenario processing module 12, thereby generating IQ data as downlink data to be transmitted to the UE simulator 100 and outputting it to the transmission buffer 22b. The transmission buffer 22b temporarily stores the IQ data.

The transmission buffer monitor 32 of the simulation time management module 30 monitors the storage state of the transmission buffer 22b, and outputs, to the interface 21, an instruction (second instruction) to transmit IQ data on condition that the transmission buffer 22b already stores IQ data of one subframe.

The interface 21 reads the IQ data of one subframe from the transformation buffer 22b, and transmits it to the UE simulator 100 in the form of an IP packet.

As described above, the base station simulator 1 of the first embodiment can start arithmetic processing when the amount of transmission data stored in the reception buffer 22a has reached a predetermined amount, thereby generating response data, storing it in the transmission buffer 22b, and transmitting the response data to the UE simulator 100 as a test target when the response data stored in the transmission buffer 22b has reached a predetermined amount.

Since thus the base station simulator 1 of the first embodiment can be synchronized with the UE simulator 100 as the test target, real-time performance is not required, and the UE simulator 100, which cannot perform real-time communication, can be evaluated accurately.

Although in the first embodiment, the communication function of the UE simulator 100 as the test target is assumed to be realized by a software program, the invention is not limited to this. For instance, the same advantage as the above can be obtained even in a communication apparatus as a test target, which is constructed by hardware and has a relatively slow processing rate and variation in processing time.

The simulation processing module 104 of the UE simulator 100 may be formed of a semiconductor integrated circuit mounted in a radio communication apparatus for processing a baseband signal. In this case, the base station simulator 1 can execute a communication test on the semiconductor integrated circuit itself before it is set in the radio communication apparatus. This contributes to the enhancement of the performance of the semiconductor integrated circuit, and also to a significant reduction in the development period and cost of the semiconductor integrated circuit and the radio communication apparatus.

Second Embodiment

Firstly, the configuration of a base station simulator according to a second embodiment will be described.

As shown in FIG. 7, a base station simulator 2 according to the second embodiment comprises a simulation time management module 50, instead of the simulation time management module 30 (see FIG. 1) in the first embodiment. Therefore, the configuration of the simulation time management module 50 will be described. In the second embodiment, elements similar to those of the test apparatus 1 of the first embodiment are denoted by corresponding reference numbers, and no detailed description will be given thereof. The base station simulator 2 constitutes the test apparatus of the second embodiment.

The simulation time management module 50 comprises an arithmetic processing start notifying module 51 and an arithmetic processing end notifying module 52.

The arithmetic processing start notifying module 51 is configured to issue an instruction to read IQ data from the reception buffer 22a, upon receiving an arithmetic processing start command included in an IP packet from the UE simulator 200. The arithmetic processing start notifying module 51 constitutes arithmetic processing start notifying means according to the invention. The arithmetic processing start command is not stored in the reception buffer 22a, and is output from the interface 21 to the simulation time management module 50.

The arithmetic processing end notifying module 52 is configured to provide the interface 21 with an instruction to transmit IQ data as the result of arithmetic processing to the UE simulator 200, and also configured to transmit an arithmetic processing start command from the interface 21 to the UE simulator 200, upon receiving, from the base station simulation processing module 40, an arithmetic processing end notification indicating that arithmetic processing of a predetermined amount of data has ended. The arithmetic processing end notifying module 52 constitutes arithmetic processing end notifying means according to the invention.

The UE simulator 200 of the second embodiment comprises a management module 201. The management module 201 causes the interface 101 to transmit an arithmetic processing start command to the base station simulator 2 when the UE simulator 200 has transmitted an arbitrarily set amount of uplink data to the base station simulator 2. Further, upon receiving the arithmetic processing start command from the base station simulator 2 via the interface 101, the management module 201 causes the layer processor 102 to start arithmetic processing on downlink data received from the base station simulator 2.

The reception and transmission processing of the base station simulator 2 according to the second embodiment will be described.

Figure 8:
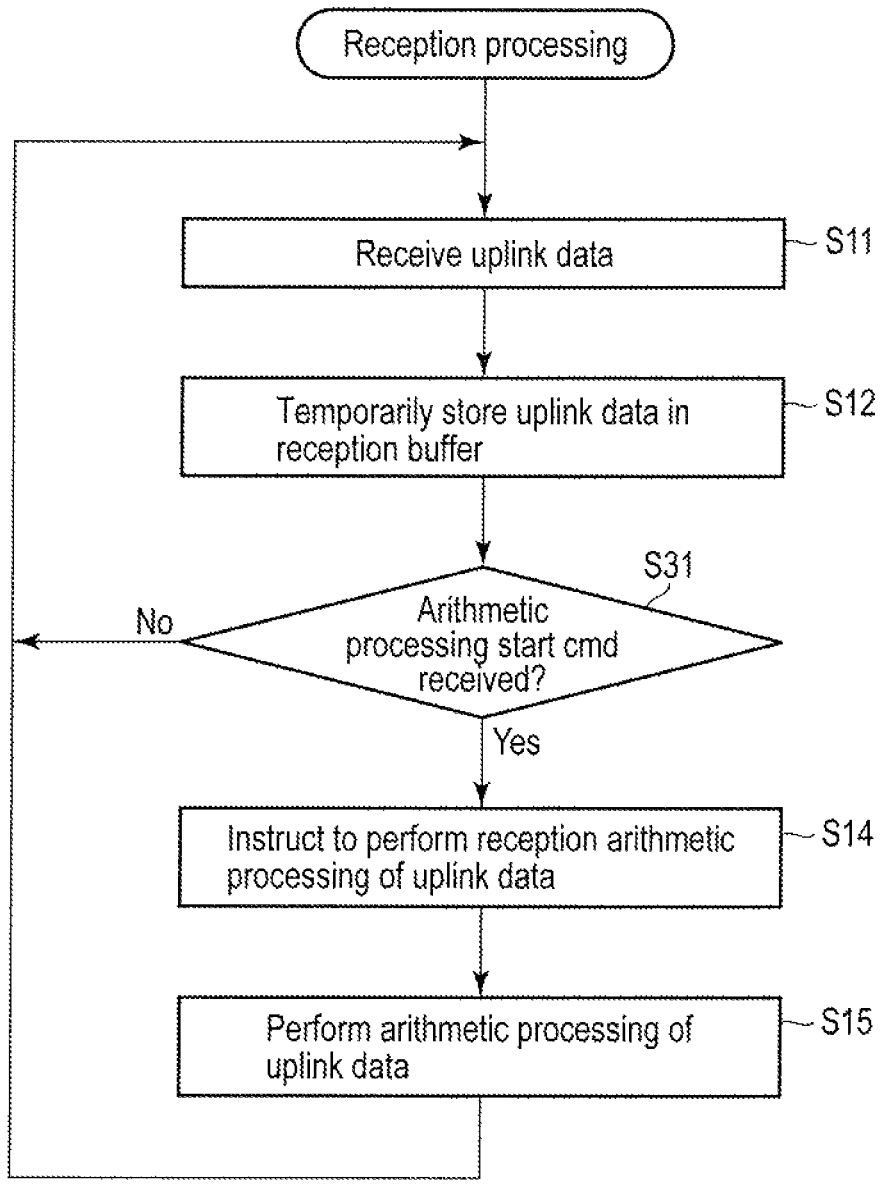
FIG. 8 is a flowchart for the reception processing of the base station simulator according to the second embodiment of the invention.

Referring first to FIGS. 7 and 8, a description will be given of the reception processing of the base station simulator 2. In this description, operations similar to those of the reception processing of the base station simulator 1 in the first embodiment are denoted by corresponding reference numbers, and are not described in detail.

As shown in FIG. 8, while the reception buffer 22a temporarily stores uplink data in step S12, the arithmetic processing start notifying module 51 determines whether or not an arithmetic processing start command (cmd) has been received from the UE simulator 200 (step S31).

If it is not determined in step S31 that the arithmetic processing start command has been received from the UE simulator 200, the program returns to step S11.

In contrast, if it is determined in step S31 that the arithmetic processing start command has been received from the UE simulator 200, the arithmetic processing start notifying module 51 provides the base station simulation processing module 40 with an instruction (first instruction) to execute reception arithmetic processing on the uplink data (step S14).

Figure 9:
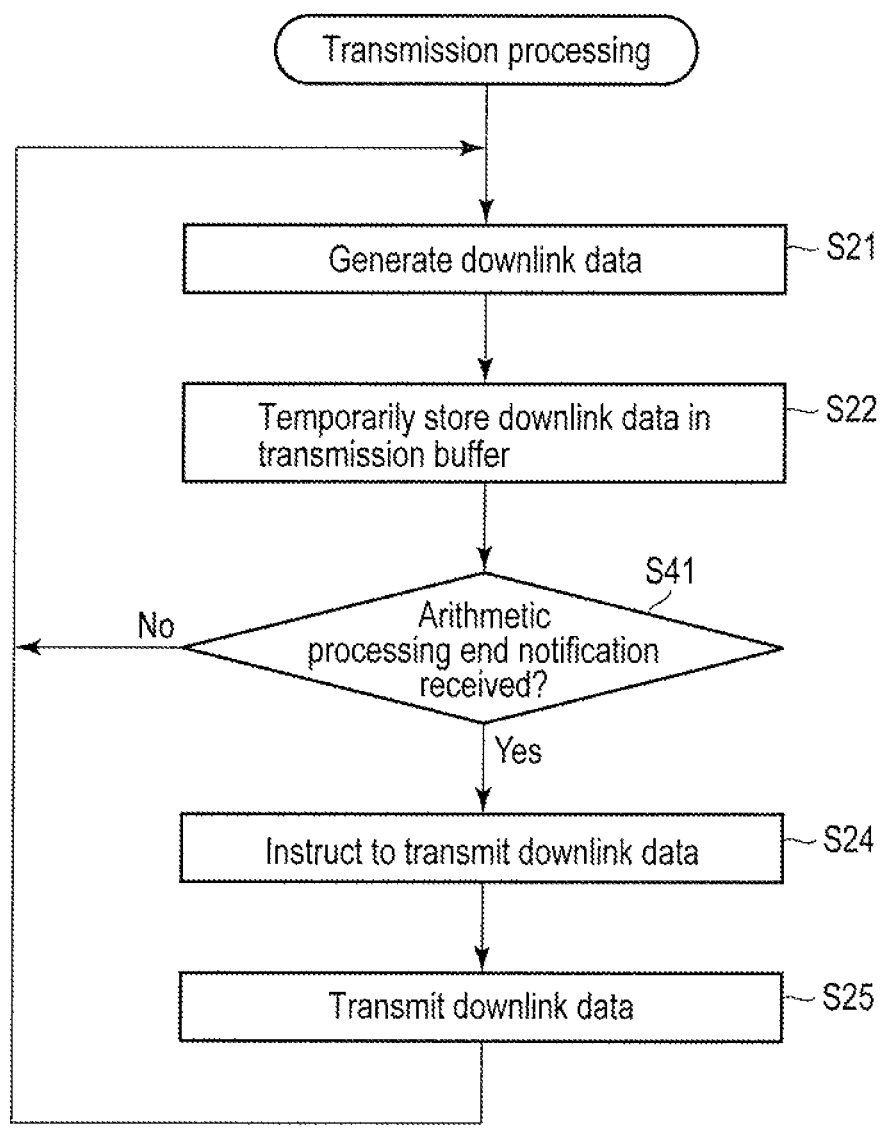
FIG. 9 is a flowchart for the transmission processing of the base station simulator according to the second embodiment of the invention.

Referring then to FIG. 9, a description will be given of the transmission processing of the base station simulator 2. In this description, operations similar to those of the transmission processing of the base station simulator 1 in the first embodiment are denoted by corresponding reference numbers, and are not described in detail.

As shown in FIG. 9, while the transmission buffer 22b temporarily stores uplink data in step S22, the arithmetic processing end notifying module 52 determines whether or not a notification of an arithmetic processing end has been received from the base station simulation processing module 40 (step S41).

If it is not determined in step S41 that the notification of the arithmetic processing end has been received from the base station simulation processing module 40, the program returns to step S21.

In contrast, if it is determined in step S41 that the notification of the arithmetic processing end has been received from the base station simulation processing module 40, the arithmetic processing end notifying module 52 provides the interface 21 with an instruction (second instruction) to transmit downlink data (step S24). After the interface 21 transmits the downlink data, the arithmetic processing end notifying module 52 causes the interface 21 to transmit an arithmetic processing start command to the UE simulator 200.

Figure 10:
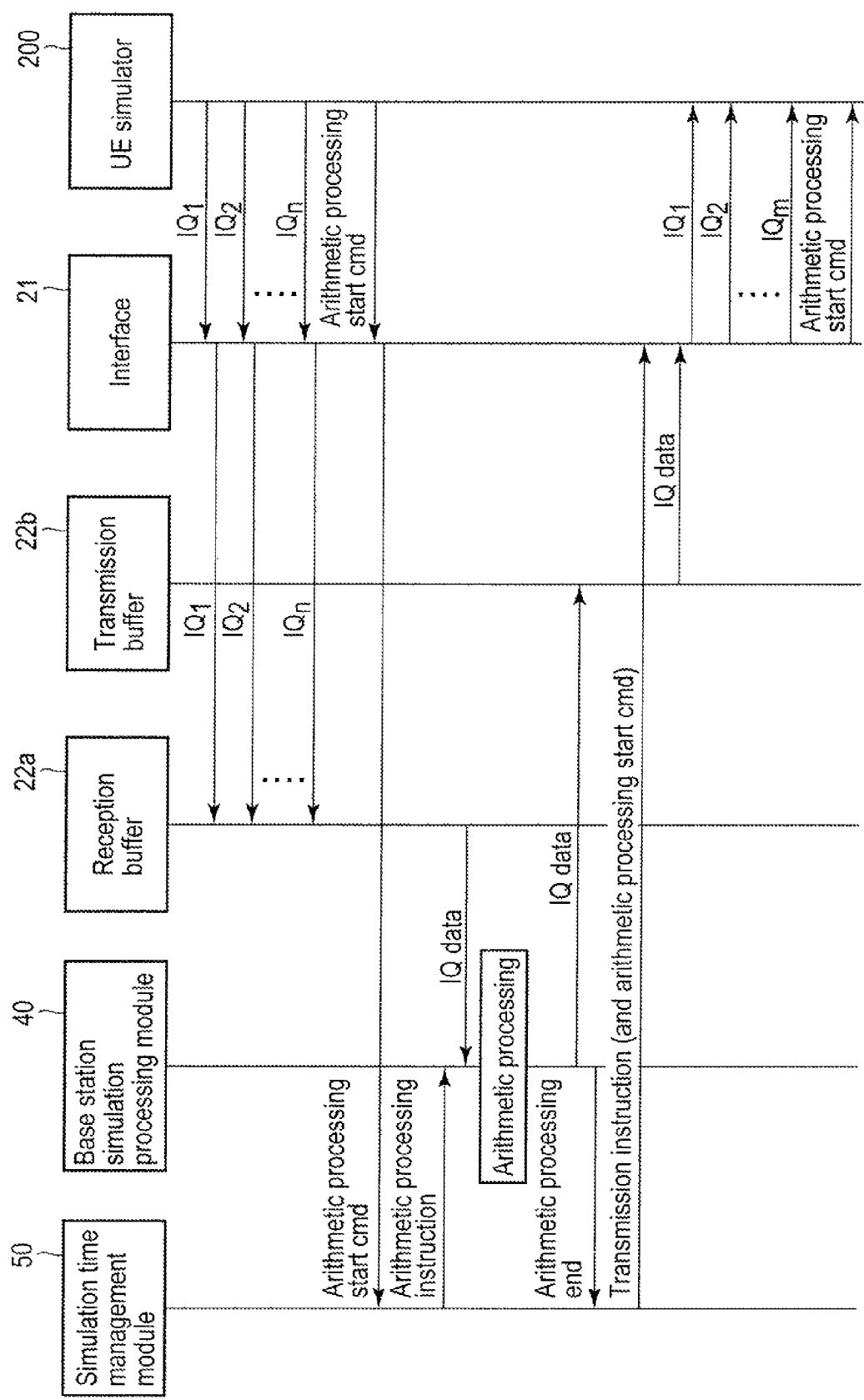
FIG. 10 is a timing chart for the base station simulator according to the second embodiment of the invention.

Referring then to the timing chart of FIG. 10, the reception and transmission processing of the base station simulator 2 will be described.

Firstly, a description will be given of the reception processing of the base station simulator 2. In this description, it is assumed that the UE simulator 200 sequentially transmits, to the interface 21, n IP packets including n IQ data items $IQ_1$ to IQn. The interface 21 extracts the IQ data from the payload part of each IP packet. The extracted IQ data is sequentially and temporarily stored in the reception buffer 22a.

Further, the UE simulator 200 transmits, to the base station simulator 2, an IP packet including the arithmetic processing start command (cmd) after transmitting the last IQ data, i.e., data IQn.

The arithmetic processing start notifying module 51 of the simulation time management module 50 provides the base station simulation processing module 40 with an instruction (first instruction) to perform reception arithmetic processing, on condition that the arithmetic processing start command has been received.

The base station simulation processing module 40 reads n IQ data items from the reception buffer 22a, and executes reception arithmetic processing on the IQ data items in accordance with predetermined communication standards.

The transmission processing of the base station simulator 2 will be described. In this description, it is assumed that the base station simulator 2 transmits, to the UE simulator 200, m IQ data items $IQ_1$ to IQm as downlink data.

The base station simulation processing module 40 executes transmission arithmetic processing based on the predetermined communication standards under the control of the scenario processing module 12, thereby generating IQ data as downlink data to be transmitted to the UE simulator 200, and outputting it to the transmission buffer 22b. At the same time, the module 40 notifies the arithmetic processing end notifying module 52 of the simulation time management module 50 that the arithmetic processing is ended. The transmission buffer 22b temporarily stores the IQ data.

The arithmetic processing end notifying module 52 of the simulation time management module 50 provides the interface 21 with an instruction (second instruction) to transmit the IQ data, on condition that the notification of the arithmetic processing end has been received from the base station simulation processing module 40.

The interface 21 reads IQ data as a transmission target from the transmission buffer 22b, and transmits it in the form of an IP packet to the UE simulator 200. The interface 21 transmits the IQ data in the form of an IP packet to the UE simulator 200 in response to the arithmetic processing start command from the arithmetic processing end notifying module 52.

The above-mentioned arithmetic processing start command may include time information in the simulation time domain. In this case, upon receiving the arithmetic processing start command from the UE simulator 200, the simulation time management module 50 acquires, from the arithmetic processing start command, time information as the reception time of corresponding uplink data. Further, when transmitting the arithmetic processing start command to the UE simulator 200, the simulation time management module 50 transmits the command, with time information as the transmission time of corresponding downlink data included in it. By imparting the same function as the above to the management module 201 of the UE simulator 200, the base station simulator 2 can manage the simulation time.

As described above, the base station simulator 2 of the second embodiment can start arithmetic processing upon receiving an arithmetic processing start command from the UE simulator 200, the arithmetic processing start command being transmitted after transmission data is transmitted. As a result, the simulator 2 can generate response data, store it in the transmission buffer 22b, and transmit the stored response data to the UE simulator 200 after the interface 21 receives an arithmetic processing end command indicating that arithmetic processing is ended.

As described above, the base station simulator 2 of the second embodiment can be synchronized with the UE simulator 200 as a test target. Therefore, the simulator 2 does not require real-time performance, which enables accurate evaluation of the UE simulator 2 that cannot achieve real-time communication.

As described above, the test apparatus and method of the invention have an advantage that they can accurately evaluate a pseudo terminal which cannot achieve real-time communication. Consequently, the test apparatus and method of the invention are useful as a test apparatus and method for communicating with a pseudo terminal that simulates the communication function of a mobile communication terminal capable of transmitting and receiving radio frequency signals based on predetermined communication standards, thereby testing the communication function during execution thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A test apparatus configured to communicate with a pseudo terminal that simulates a communication function of a mobile communication terminal for transmitting and receiving radio frequency signals based on a predetermined communication standard, thereby testing the communication function during execution thereof, comprising:
    a transmitting/receiving module configured to transmit and receive digital data corresponding to a baseband signal to and from the pseudo terminal;
    a reception buffer configured to temporarily store uplink data as the data received from the pseudo terminal by the transmitting/receiving module;
    a transmission buffer configured to temporarily store downlink data as the data to be transmitted to the pseudo terminal via the transmitting/receiving module;
    an arithmetic processing module configured to execute reception arithmetic processing, based on the predetermined communication standard, on the uplink data read from the reception buffer, to execute transmission arithmetic processing based on the predetermined communication standard to generate the downlink data, and to store the generated downlink data in the transmission buffer; and
    a management module configured to provide, under a first predetermined condition, the arithmetic processing module with a first instruction to execute the reception arithmetic processing, and to provide, under a second predetermined condition, the transmitting/receiving module with a second instruction to transmit the downlink data stored in the transmission buffer.

2. The test apparatus according to claim 1, wherein the management module further comprises:
    a reception buffer monitoring module configured to monitor the reception buffer, and to provide the arithmetic processing module with the first instruction using, as the first predetermined condition, the fact that an amount of the uplink data stored in the reception buffer has reached a predetermined amount; and
    a transmission buffer monitoring module configured to monitor the transmission buffer, and to provide the transmitting/receiving module with the second instruction using, as the second predetermined condition, the fact that an amount of the downlink data stored in the transmission buffer has reached a predetermined amount.

3. The test apparatus according to claim 1, wherein
    the pseudo terminal transmits, to the test apparatus, an arithmetic processing start command to start arithmetic processing, in association with the transmission, by the pseudo terminal, of an amount of uplink data to be subjected step by step to the reception arithmetic processing by the arithmetic processing module; and
    the management module further comprises:
        an arithmetic processing start notifying module configured to provide the arithmetic processing module with the first instruction, using, as the first predetermined condition, the fact that the arithmetic processing start command is received from the pseudo terminal; and
        an arithmetic processing end notifying module configured to provide the transmitting/receiving module with the second instruction, using, as the second predetermined condition, the fact that the arithmetic processing module has finished generation of the downlink data.

4. The test apparatus according to claim 1, wherein the management module manages a simulation time that differs from a real time and is measured during execution of the communication function of the pseudo terminal.

5. The test apparatus according to claim 4, wherein the arithmetic processing module includes a plurality of layers whose processes are defined by the communication standard, further comprising:
    a log data generation module configured to generate communication log data between predetermined layers of the arithmetic processing module; and
    a log display configured to display a log based on the log data,
    wherein
    the log data generation module generates the log data in a manner that the log data includes time information associated with the simulation time; and
    the log display displays the log in a manner that the log includes the time information associated with the simulation time.

6. The test apparatus according to claim 5, wherein
    the log data generation module generates log data including time information associated with the real time, as well as the time information associated with the simulation time; and
    the log display displays a log that recites both the time information associated with the simulation time and the time information associated with the real time.

7. The test apparatus according to claim 1, wherein the communication function of the pseudo terminal is realized by a software program.

8. The test apparatus according to claim 1, wherein the communication function of the pseudo terminal is realized by a semiconductor integrated circuit.

9. The test apparatus according to claim 1, wherein the transmitting/receiving module performs communication using TCP/IP as a communication protocol.

10. A test method for testing a communication function of a mobile communication terminal during execution of the communication function, by communicating with a pseudo terminal that simulates the communication function of the mobile communication terminal that transmits and receives radio frequency signals based on a predetermined communication standard, comprising:
    receiving uplink data as digital data corresponding to a baseband signal from the pseudo terminal;
    temporarily storing the uplink data;

providing, under a first predetermined condition, a first instruction to process the temporarily stored uplink data;

executing, on the uplink data, reception arithmetic processing based on the communication standard in response to the first instruction;

executing transmission arithmetic processing based on the communication standard to generate downlink data as digital data corresponding to a baseband signal to be transmitted to the pseudo terminal;

temporarily storing the downlink data;

providing, under a second predetermined condition, a second instruction to transmit the temporarily stored downlink data; and transmitting the downlink data to the pseudo terminal.

11. The test method according to claim 10, wherein the providing the first instruction includes providing the first instruction using, as the first predetermined condition, the fact that an amount of the temporarily stored uplink data has reached a predetermined amount; and the providing the second instruction includes providing the second instruction using, as the second predetermined condition, the fact that an amount of the temporarily stored downlink data has reached a predetermined amount.

12. The test method according to claim 10, wherein the pseudo terminal transmits an arithmetic processing start command to start arithmetic processing, in association with the transmission, by the pseudo terminal, of an amount of uplink data to be subjected step by step to the reception arithmetic processing;

the providing the first instruction includes providing the first instruction, using, as the first predetermined condition, the fact that the arithmetic processing start command is received from the pseudo terminal; and the providing the second instruction includes providing the second instruction, using, as the second predetermined condition, the fact that a step of generating the downlink data is finished.

13. The test method according to claim 10, wherein providing the first instruction and the providing the second instruction each include managing a simulation time that differs from a real time and is measured during execution of the communication function of the pseudo terminal.

14. The test method according to claim 13, wherein the reception arithmetic processing and generation of the downlink data are executed by a plurality of layers defined by the communication standard, further comprising:

generating communication log data between predetermined layers in the reception arithmetic processing and generation of the downlink data; and displaying a log based on the log data, wherein the generating the log data includes generating the log data in a manner that the log data includes time information associated with the simulation time; and the displaying the log includes displaying the log in a manner that the log includes the time information associated with the simulation time.

15. The test method according to claim 14, wherein the generating the log data includes generating log data including time information associated with the real time, as well as the time information associated with the simulation time; and the displaying the log includes displaying a log that recites both the time information associated with the simulation time and the time information associated with the real time.

16. The test method according to claim 10, wherein the communication function of the pseudo terminal is realized by a software program.

17. The test method according to claim 10, wherein the communication function of the pseudo terminal is realized by a semiconductor integrated circuit.

18. The test method according to claim 10, wherein the transmitting the downlink data to the pseudo terminal includes executing communication using TCP/IP as a communication protocol.

* * * * *